United States Patent [19]

Ward

[11] Patent Number: 5,209,059

[45] Date of Patent: May 11, 1993

[54] ACTIVE COOLING APPARATUS FOR AFTERBURNERS

[75] Inventor: Eric Ward, W. Palm Beach, Fla.

[73] Assignee: The United States of America as represented by the Secretary of the Air Force, Washington, D.C.

[21] Appl. No.: 820,728

[22] Filed: Dec. 27, 1991

[51] Int. Cl.⁵ .................. F02K 3/10; F02K 11/00; B64D 33/04

[52] U.S. Cl. ........................... 60/261; 60/265; 60/266; 60/271; 239/127.1; 239/265.37; 239/265.43

[58] Field of Search ............... 60/261, 265, 266, 271; 415/12; 239/127.1, 265.17, 265.33, 265.37, 265.43

[56] References Cited

U.S. PATENT DOCUMENTS

| | | | |
|---|---|---|---|
| 3,587,232 | 6/1971 | Bryce | 60/261 |
| 3,848,697 | 11/1974 | Jannot et al. | 181/33 HB |
| 4,071,194 | 1/1978 | Eckert et al. | 239/127.3 |
| 4,171,093 | 10/1979 | Honeycutt, Jr. et al. | 239/127.3 |
| 4,187,675 | 2/1980 | Wakeman | 60/39.75 |
| 4,203,286 | 5/1980 | Warburton | 60/266 |
| 4,493,184 | 1/1985 | Nikkanen et al. | 60/204 |
| 4,747,543 | 5/1988 | Madden | 239/127.3 |
| 4,800,718 | 1/1989 | Zimmerman | 239/265.17 |
| 5,069,034 | 12/1991 | Jourdain et al. | 60/261 |
| 5,077,969 | 1/1992 | Liang et al. | 60/261 |
| 5,131,222 | 7/1992 | Auxier et al. | 60/266 |

Primary Examiner—Richard A. Bertsch
Assistant Examiner—Howard R. Richman
Attorney, Agent, or Firm—Stanton E. Collier; Donald J. Singer

[57] ABSTRACT

The present invention comprises at least one active cooling apparatus incorporated into the nozzle liner of sidewall of an afterburner. The liner has a plurality of cooling air holes located under the apparatus. Within the liner is a supply of cooling air under high pressure. Over the holes in the liner is flexibly attached the active cooling apparatus which is composed of an inner manifold having a bottom layer with a plurality of receiving holes therein which are offset from the supply holes of the liner and a top layer also having a plurality of vent holes therein which are further offset from the holes in the bottom layer. Attached over the inner manifold is a hot cover layer which is located a small distance above the inner manifold top layer. The hot cover layer also has a plurality of flow path holes therein. A hot gas stream flowing over the hot cover layer bleeds into the inner manifold. Due to the differences in thermal expansion rates of the bottom layer, the top layer and the hot cover layer, the layers bow out from the liner. When this occurs, the cooling air can flow out into the active cooling apparatus and into the hot exhaust gas and in so doing reduces the temperature of the active cooling apparatus and allows it to bow back to the liner and close the holes therebetween once the hot stream stops.

2 Claims, 1 Drawing Sheet

ACTIVE COOLING APPARATUS FOR AFTERBURNERS

STATEMENT OF GOVERNMENT INTEREST

The invention describes herein may be manufactured and used by or for the Government for governmental purposes without the payment of any royalty thereon.

BACKGROUND OF THE INVENTION

The present invention relates to jet engines, and, in particular, relates to jet engines having afterburners, and, in greater particularity, relates to cooling of the liner therein.

Typical afterburners are provided with a liner whose function is to produce a film of cooling air to protect the nozzle flow path components from the hot exhaust gases. While this approach maintains allowable metal temperatures, large quantities of cooling air are required which reduce its efficiency. Another problems with this type of liner is the warping and other distortion that occur due to thermally induced stresses resulting from attaching a hot liner to a cooled casing. This distortion causes variations in the cooling efficiency and the warped surface decrease the sealing efficiency. A fourth problem is hot streaks. The hot streaks can cause metal temperatures to rise locally by several hundred degrees compared to the average temperature. The current cooling systems provide a constant air flow to each area. Since it is unable to compensate for local hot streaks, the entire duct and nozzle are cooled as if under hot streak conditions. Since the actual hot streaks cover a minority of the surface area, most of the area is receiving excess cooling air. There are also areas of the sidewall which are exposed to hot flow only at certain nozzle positions such as maximum jet area or thrust vectoring. These areas receive unneeded flow at other times.

Thus there is a need for active cooling means to locally tailor the cooling air flow to local conditions thus allowing all of the liner area to operate at design temperatures.

SUMMARY OF THE INVENTION

The present invention provides a means of protecting the wall from hot streaks within the exhaust nozzle of a jet engine afterburner.

The present invention comprises at least one active cooling apparatus incorporated into the nozzle liner or sidewall. The liner has a plurality of cooling air holes located under the apparatus. Within the liner is a supply of cooling air under high pressure. Over the holes in the liner is flexibly attached the active cooling apparatus which is composed of an inner manifold having a bottom layer with a plurality of receiving holes therein which are offset from the supply holes of the liner and a top layer over the bottom layer also having a plurality of vent holes therein which are further offset from the holes in the bottom layer. Attached over the inner manifold is a hot cover layer which is located a small distance above the inner manifold top layer. The hot cover layer also has a plurality of flow path holes therein. A hot gas stream flowing over the hot cover layer bleeds into the inner manifold. Since the hot cover, inner manifold and bottom layer are tied together around the perimeter of the apparatus, the differential in thermal expansions of these parts forces them to bow outward, away from the liner. When this occurs, the cooling air can flow out into the active cooling apparatus and into the hot exhaust gas and in so doing reduces the temperature of the active cooling apparatus and allows it to bow back to the liner and close the holes therebetween once the hot streak stops.

Therefore, one object of the present invention is to provide an apparatus to reduce the hot streaking in an afterburner nozzle.

Another object of the present invention is to provide an active cooling apparatus for an afterburner exhaust nozzle.

Another object of the present invention is to provide an active cooling apparatus for an afterburner exhaust nozzle to eliminate hot streak damage.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

Figure 1:
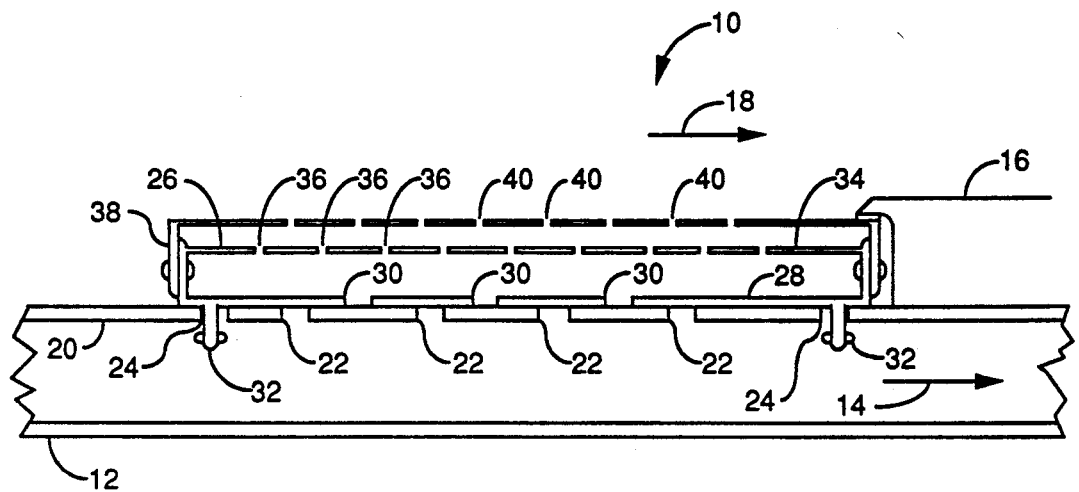
FIG. 1 illustrates by cross section side view the active cooling apparatus attached to a liner.

Referring to FIG. 1, an active cooling apparatus 10 is shown located in an afterburner nozzle, for example, where hot streaks occur. The active cooling apparatus 10 is flexibly attached to a flap or sidewall liner 12 therein which has a pressurized flow of cooling air 14 therein. An abutting structure 16 provides for a streamline flow of hot gases 18 in the exhaust flow path over the active cooling apparatus 10.

The liner 12 has an outer wall 20 with a plurality of cooling air supply holes 22 therein with attachment holes 24 also located therein.

The active cooling apparatus 10 has an inner manifold 26 being a container of metal having a bottom layer 28 with a plurality of receiving holes 30 therein which are offset from the supply holes 22. Also attached to the bottom layer 28 are attaching lugs 32 which are placed in the attachment holes 24. A top layer 34 has a plurality of vent holes 36.

Attached over the inner manifold 26 is a hot cover layer 38 which is offset a short distance from the top layer 34 and also has a plurality of flow path holes 40.

When constructed, the bottom layer 28 is made of a metal having a lower thermal expansion than the top cover layer 30. In normal operations, FIG. 1, the bottom layer 28 and the outer wall 20 are in close contact which prevents the flow of cooling air 14 into the inner manifold 26.

Figure 2:
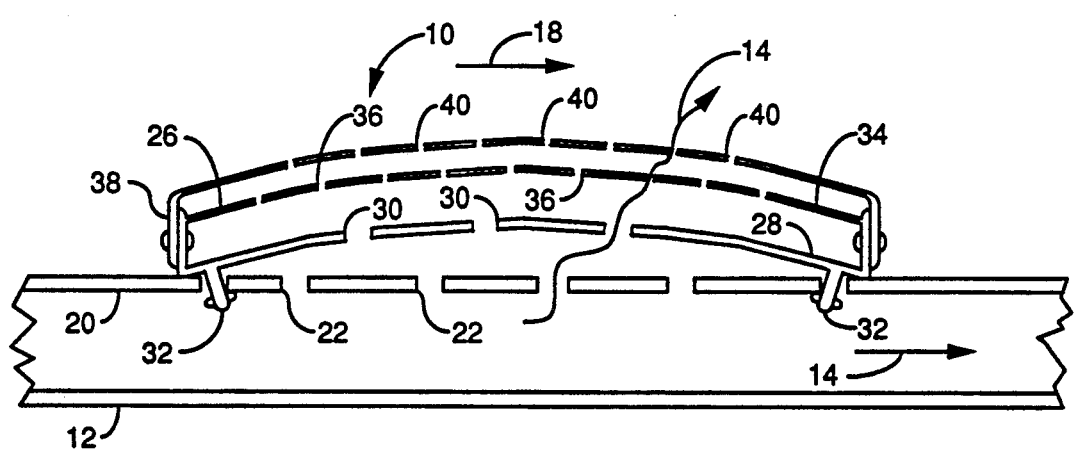
FIG. 2 illustrates the active cooling apparatus of FIG. 1 in a position to allow cooling air into the hot gas flow.

During a hot streak, the hot cover layer 38 becomes much hotter than the bottom layer 28 and due to the differences of thermal expansions, the layers 28, 34 and 38 bow out; the hotter, the greater the bow to a degree, FIG. 2, to allow the cooling air 14 to cool the layers down. When the hot streak stops, the active cooling apparatus 10 returns to the FIG. 1 configuration.

With this active cooling apparatus 10, savings of 20 to 30 percent of cooling air flow are possible since only the areas having hot streaks are cooled.

Clearly, many modifications and variations to the present invention are possible in light of the above teachings and it is therefore understood, that within the inventive scope of the inventive concept, the invention may be practiced otherwise than specifically claimed.

What is claimed is:

1. An active cooling apparatus for use in jet engines having afterburners therein, said active cooling apparatus comprising:

a liner of the afterburner, said liner having a plurality of cooling air supply holes and the jet engine providing cooling air to the supply holes;

an inner manifold, said inner manifold being a container having a bottom layer, a top layer, and walls thereabout, said bottom layer having a plurality of receiving holes therein and offset from the cooling air holes of said liner, said bottom layer further having attaching means to be connected to said liner, said top layer having a plurality of vent holes therein, a volume of space existing between said bottom layer and said top layer, said bottom layer and said top layer being substantially parallel; and a hot cover layer, said hot cover layer attached directly over said top layer and spaced therefrom, said hot cover layer having a plurality of flow path holes therein;

said bottom layer having less thermal expansion than said top layer, said top layer having less thermal expansion than said hot cover layer whereby a hot gas flow over said hot cover layer causes a bowing of said layers away from said liner thus allowing cooling air to flow into the active cooling apparatus.

2. An active cooling apparatus as defined in claim 1 wherein said attaching means of said bottom layer are lugs that are above to move in said liner and allow the bottom layer to flex.

* * * * *